US012115635B2

(12) United States Patent
Hartmann et al.

(10) Patent No.: US 12,115,635 B2
(45) Date of Patent: Oct. 15, 2024

(54) CONTROL METHOD FOR A PERCUSSIVE HAND-HELD POWER TOOL

(71) Applicant: Hilti Aktiengesellschaft, Schaan (LI)

(72) Inventors: Markus Hartmann, Mauerstetten (DE); Franz Moessnang, Stadtbergen (DE); Laurent-Sebastian Kock, Poing (DE); Philipp Lorenz, Munich (DE); Eduard Pfeiffer, Halblech (DE)

(73) Assignee: Hilti Aktiengesellschaft, Schaan (LI)

( * ) Notice: Subject to any disclaimer, the term of this patent is extended or adjusted under 35 U.S.C. 154(b) by 1102 days.

(21) Appl. No.: 16/469,008

(22) PCT Filed: Dec. 6, 2017

(86) PCT No.: PCT/EP2017/081634
§ 371 (c)(1),
(2) Date: Jun. 12, 2019

(87) PCT Pub. No.: WO2018/108658
PCT Pub. Date: Jun. 21, 2018

(65) Prior Publication Data

US 2019/0314970 A1 Oct. 17, 2019

(30) Foreign Application Priority Data

Dec. 14, 2016 (EP) .................................... 16203920

(51) Int. Cl.
*B25D 11/06* (2006.01)

(52) U.S. Cl.
CPC ...... *B25D 11/06* (2013.01); *B25D 2216/0015* (2013.01); *B25D 2250/221* (2013.01)

(58) Field of Classification Search
CPC ............ B25D 9/00; B25D 11/06; B25Q 5/00
See application file for complete search history.

(56) References Cited

U.S. PATENT DOCUMENTS

| | | | | |
|---|---|---|---|---|
| 6,247,437 B1 * | 6/2001 | Yamaguchi | B60L 50/16 | 123/179.3 |
| 7,681,659 B2 * | 3/2010 | Zhang | B25B 21/00 | 173/1 |
| 7,980,324 B2 * | 7/2011 | Bixler | B25F 5/001 | 173/176 |

(Continued)

FOREIGN PATENT DOCUMENTS

| | | |
|---|---|---|
| CN | 103372852 A | 10/2013 |
| DE | 19843644 | 4/2000 |

(Continued)

OTHER PUBLICATIONS

International Search Report of PCT/EP2017/081634, dated Mar. 26, 2018.

*Primary Examiner* — Thomas M Wittenschlaeger
*Assistant Examiner* — David G Shutty
(74) *Attorney, Agent, or Firm* — Davidson Kappel, LLC

(57) ABSTRACT

A control method for a percussive hand-held power tool (1) includes the steps: detecting a switching state of an operating button (12), detecting a temperature T using a temperature sensor (22), activating an electropneumatic striking mechanism (5) in response to an actuation of the operating button (12), an exciter (13) of the electropneumatic striking mechanism (5) being moved forward and backward along a working axis (3) at a repetition rate R, whereby a striker (14) coupled to the exciter (13) via a pneumatic chamber (16) is also moved. If the temperature T is greater than a limiting temperature Tc, the repetition rate R is continuously increased from idle up to a setpoint value (21). A duration until reaching the setpoint value (21) is less than 10 cycles. If the temperature T is less than the limiting temperature Tc, a duration until reaching the setpoint value (21) is greater than 200 cycles.

19 Claims, 5 Drawing Sheets

(56) References Cited

U.S. PATENT DOCUMENTS

| | | | | |
|---|---|---|---|---|
| 7,980,440 | B2 * | 7/2011 | Hahn | B25C 1/08 227/10 |
| 9,815,160 | B2 | 11/2017 | Nitsche et al. | |
| 2002/0094910 | A1 * | 7/2002 | Endo | B62D 5/07 477/97 |
| 2006/0144602 | A1 * | 7/2006 | Arich | B25D 17/20 173/109 |
| 2009/0277657 | A1 * | 11/2009 | Berger | F16N 7/14 173/114 |
| 2010/0186975 | A1 | 7/2010 | Glauing et al. | |
| 2012/0063922 | A1 * | 3/2012 | Sano | F16H 61/0206 417/44.1 |
| 2013/0186661 | A1 * | 7/2013 | Okubo | B25D 11/005 173/2 |
| 2013/0284473 | A1 | 10/2013 | Hartmann et al. | |
| 2014/0356190 | A1 * | 12/2014 | Kalbeck | B60T 13/46 417/12 |
| 2015/0101835 | A1 * | 4/2015 | Nitsche | B25D 11/06 173/201 |
| 2015/0129248 | A1 * | 5/2015 | Nitsche | B25D 16/006 171/1 |
| 2015/0136433 | A1 * | 5/2015 | Nitsche | B25D 11/005 173/2 |
| 2015/0202758 | A1 * | 7/2015 | Nitsche | B25D 11/125 173/1 |
| 2017/0036315 | A1 * | 2/2017 | Wimitzer | B23Q 17/12 |
| 2017/0274517 | A1 | 9/2017 | Mascall et al. | |
| 2017/0326719 | A1 * | 11/2017 | Ueda | B25D 17/26 |
| 2019/0316578 | A1 * | 10/2019 | Araki | F04B 49/20 |

FOREIGN PATENT DOCUMENTS

| | | | | |
|---|---|---|---|---|
| DE | 102012208870 | | 11/2013 | |
| EP | 3009236 | A1 | 4/2016 | |
| JP | 2010530313 | A | 9/2010 | |
| WO | WO-2015067590 | A1 * | 5/2015 | B25D 11/125 |

* cited by examiner

CONTROL METHOD FOR A PERCUSSIVE HAND-HELD POWER TOOL

The present invention relates to control methods for a percussive hand-held power tool, in particular a hand-held pneumatic percussion drill and a hand-held pneumatic power chisel.

BACKGROUND

The striking mechanism of a percussion drill heats up during operation due to friction of moving components and thermal losses in the air spring. An operating temperature between 80° C. and 150° C. typically results. Lubricants, seals, dimensions, and tolerances of the striking mechanism are designed with regard to the typical operating temperature. However, at the beginning of being put into operation, the striking mechanism is cold, in particular in cold work environments below the freezing point. The conditions are not optimal for the striking mechanism and may prevent reliable starting of the striking mechanism.

SUMMARY OF THE INVENTION

The present invention provides a control method for a percussive hand-held power tool including the steps: detecting a switching state of an operating button, detecting a temperature using a temperature sensor, activating an electropneumatic striking mechanism in response to an actuation of the operating button, an exciter of the electropneumatic striking mechanism being moved forward and back along a working axis at a repetition rate R, whereby a striker coupled to the exciter via a pneumatic chamber is also moved. If the temperature is greater than a limiting temperature, the repetition rate is continuously increased from idle up to a setpoint value. A duration until reaching the setpoint value is less than 10 cycles. If the temperature is less than the limiting temperature, a duration until reaching the setpoint value is greater than 200 cycles.

In one design, if the temperature is greater than the limiting temperature, the repetition rate is continuously increased at a first acceleration. Otherwise, if the temperature is less than the limiting temperature, in a first phase, an intermediate value is set, the repetition rate being increased at least partially at the first acceleration, and in a second phase, the repetition rate is continuously increased at a second acceleration up to the setpoint value. The second acceleration may be less than 1/10 of the first acceleration.

BRIEF DESCRIPTION OF THE FIGURES

The following description explains the present invention on the basis of exemplary specific embodiments and figures.

Identical or functionally-identical elements are indicated by identical reference numerals in the figures, if not specified otherwise.

DETAILED DESCRIPTION

Figure 1:
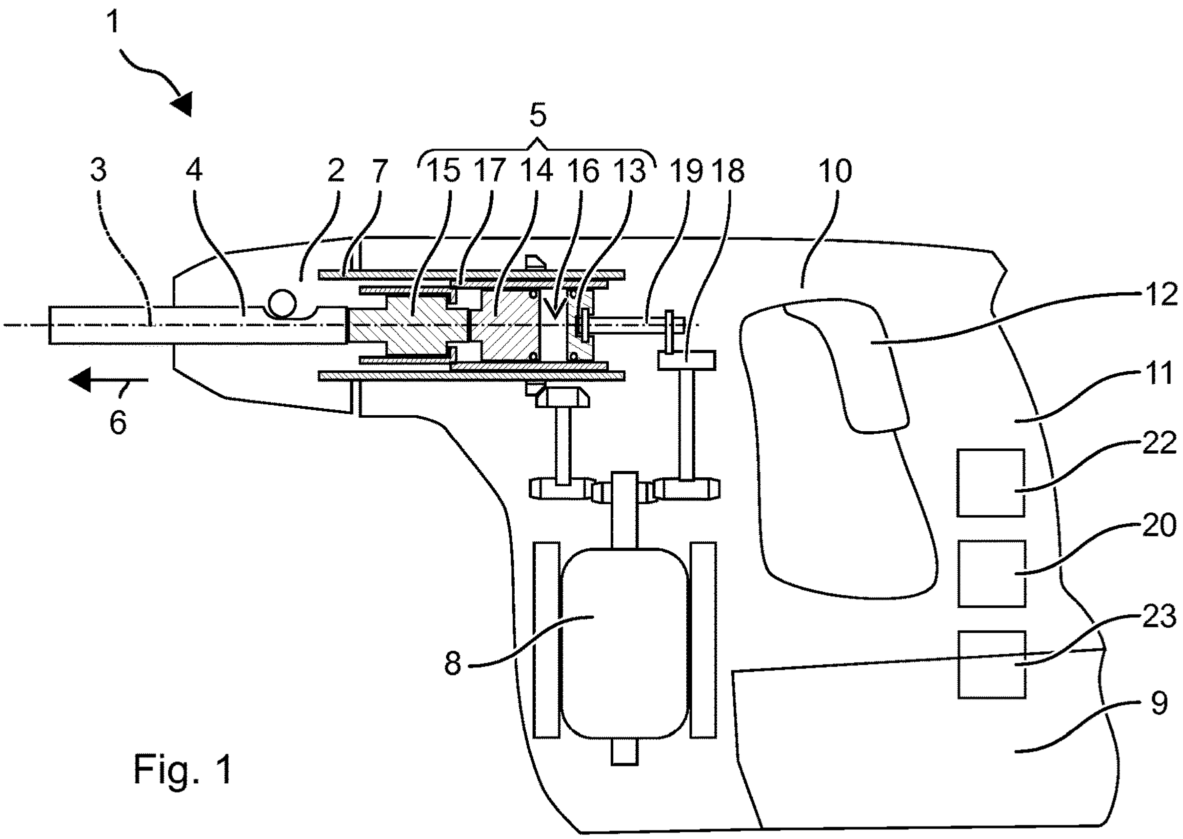
FIG. 1 shows a percussion drill

FIG. 1 shows a percussion drill 1 as an example of a percussive hand-held power tool. Percussion drill 1 includes a tool holder 2, in which a drill, chisel, or another percussive tool 4 may be inserted and locked coaxially to a working axis 3. Percussion drill 1 includes a pneumatic striking mechanism 5, which may periodically exert strikes in an impacting direction 6 on tool 4. A rotary drive 7 may continuously rotate tool holder 2 around working axis 3. Pneumatic striking mechanism 5 and the rotary drive are driven by an electric motor 8, which is fed with electric current from a battery 9 or a power cable.

Striking mechanism 5 and rotary drive 7 are situated in a machine housing 10. A handle 11 is typically situated on a side of machine housing 10 facing away from tool holder 2. The user may hold and guide percussion drill 1 with the aid of handle 11 during operation. An additional auxiliary handle may be fastened close to tool holder 2. An operating button 12, which the user may preferably actuate using the holding hand, is situated on or in the vicinity of handle 11. Electric motor 8 is switched on by actuating operating button 12. Electric motor 8 typically rotates as long as operating button 12 is kept pressed down.

Pneumatic striking mechanism 5 includes an exciter 13, a striker 14, and optionally an anvil 15 along impacting direction 6. Exciter 13 is forced into a periodic movement along working axis 3 with the aid of electric motor 8. Striker 14 is coupled to the movement of exciter 13 via an air spring. The air spring is formed by a pneumatic chamber 16 closed between exciter 13 and striker 14. Striker 14 moves in impacting direction 6 until striker 14 strikes on anvil 15. Anvil 15 rests on tool 4 in impacting direction 6 and transmits the strike to tool 4.

Exemplary striking mechanism 5 includes a piston-shaped exciter 13 and a piston-shaped anvil 14, which are guided by a guide tube 17 along working axis 3. Exciter 13 and striker 14 rest with their lateral surfaces on the inner surface of guide tube 17. Pneumatic chamber 16 is closed by exciter 13 and striker 14 along working axis 3 and by guide tube 17 in the radial direction. Sealing rings in the lateral surfaces of exciter 13 and striker 14 may improve the airtight closure of pneumatic chamber 16.

Exciter 13 is connected via a gearbox component to electric motor 8. The gearbox component converts the rotary movement of electric motor 8 into a periodic translational movement along working axis 3. An exemplary gearbox component is based on an eccentric wheel 18, which is connected to electric motor 8. A connecting rod 19 connects eccentric wheel 18 to exciter 13. Exciter 13 moves synchronously with electric motor 8. Electric motor 8 typically rotates in response to an actuation of operating button 12 and rotates as long as the user keeps operating button 12 actuated. The periodic forward and backward movement of exciter 13 also begins and ends with actuation and release, respectively, of operating button 12. Another example of such a gearbox component is a wobble drive.

Exciter 13 moves at a repetition rate R, which is proportional to the speed of electric motor 8. The gearbox components between electric motor 8 and exciter 13 typically have a step-down effect in a fixed ratio. Repetition rate R is in the range, for example, between 30 cycles per second (Hz) and 150 Hz. Striker 14 is coupled during ongoing operation by pneumatic chamber 16 to exciter 13 and moves at the same repetition rate as exciter 13. The coupling of striker 14 to exciter 13 is carried out exclusively via an air spring. The air spring is based on a pressure difference between the pressure in pneumatic chamber 16 and the pressure in the surroundings. Forcibly-moved exciter 13 increases or decreases the pressure in pneumatic chamber 16 with the aid of its periodic axial movement. Striker 14 is accelerated by the pressure difference in impacting direction 6 or against impacting direction 6.

Percussion drill 1 includes a device controller 20, which specifies repetition rate R of exciter 13. Device controller 20 controls electric motor 8. For example, electric motor 8 includes a speed regulator, which specifies a setpoint value for the speed by device controller 20. A speed regulator may also be implemented in device controller 20 based on a speed sensor on the motor shaft and a negative feedback loop. Alternatively, device controller 20 may limit a power consumption of striking mechanism 5 or a power consumption of electric motor 8 to specify the repetition rate.

Device controller 20 detects the position of operating button 12. Operating button 12 has an off position, in response to which device controller 20 specifies a repetition rate of zero, i.e., impact mechanism 5 switches off. Operating button 12 has an on position, in response to which device controller 20 activates impact mechanism 5. Electric motor 8 is accelerated up to a rated value to obtain a specified setpoint repetition rate 21 of exciter 13. Operating button 12 preferably returns automatically from the on position into the off position if operating button 12 is not kept actuated.

The increase of repetition rate R upon the change of operating button 12 from the off position into the on position takes place as a function of a temperature T of percussion drill 1. A temperature sensor 22 in machine housing 10 measures present operating temperature T. Temperature sensor 22 may be situated on striking mechanism 5 or together with other electronics of device controller 20 on a circuit board.

Figure 2:
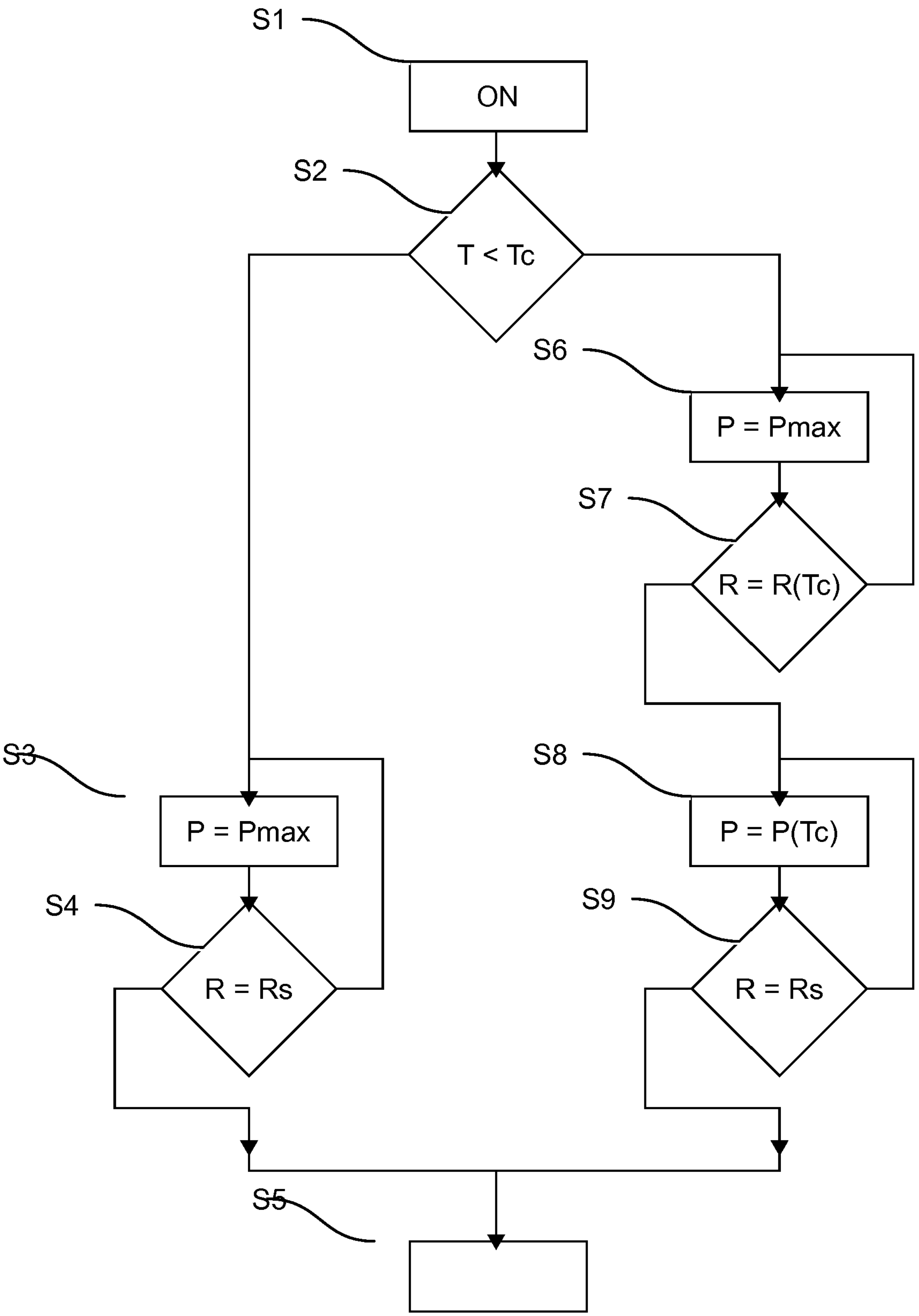
FIG. 2 shows a control diagram
Figure 3:
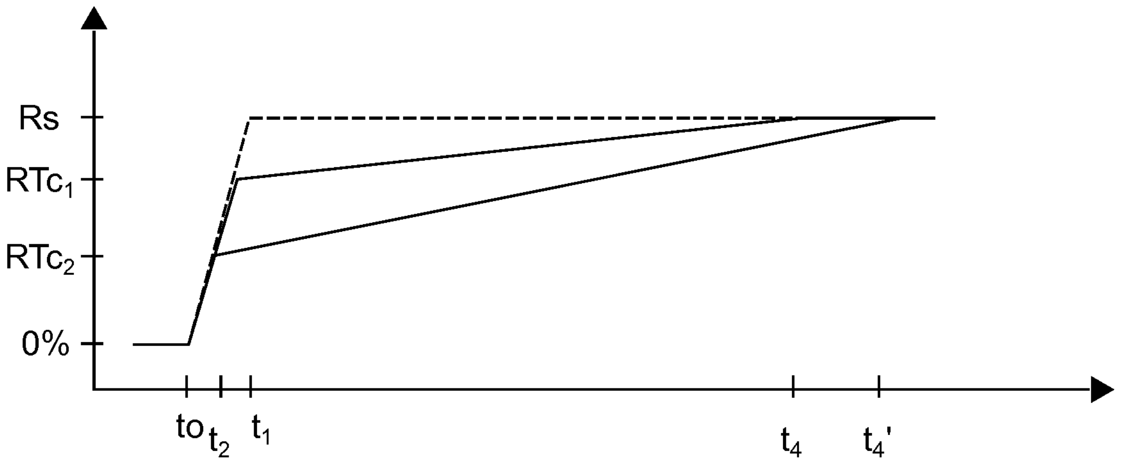
FIG. 3 shows a repetition rate after switching on the percussion drill

FIG. 2 shows an exemplary control plan of device controller 20. FIG. 3 shows the behavior of repetition rate R for different temperatures. The repetition rate is plotted over the ordinate; the time is plotted over the abscissa. The user presses operating button 12. Operating button 12 changes from the off position into the or one of the on positions. Device controller 20 detects the pressed position at point in time t2 (S1). Striking mechanism 5 is now activated.

Device controller 20 detects temperature T from temperature sensor 22 and compares temperature T to a limiting temperature Tc (S2). Limiting temperature Tc is less than, for example, 10° C., for example, 10° C., 5° C., 0° C., −5° C., −10° C. Limiting temperature Tc may be set, inter alia, as a function of the lubricating oil used in striking mechanism 5.

Assuming temperature T is above limiting temperature Tc. Exciter 13 begins to move forward and backward. Exciter 13 is indirectly accelerated (S3), in the example by electric motor 8. Repetition rate R increases up to setpoint repetition rate 21. Upon reaching setpoint repetition rate 21, percussion drill 1 is completely ready for operation and the switching-on procedure is completed. Setpoint repetition rate R is specified for a striking mechanism 5 and the efficiency or the striking performance of striking mechanism 5 is typically highest at repetition rate R. Typical setpoint repetition rates of hand-held percussion drills are in the range between 30 cycles per second (Hz) for larger striking mechanisms and 150 Hz for smaller striking mechanisms. The further behavior of percussion drill 1 is dependent on the application and the use by the user (S5). The curve of repetition rate R is shown by a dashed line in FIG. 3.

Setpoint repetition rate R is preferably reached as quickly as possible. A power consumption P of striking mechanism 5, in this example the power consumption of driving electric motor 8, is preferably not limited by a controller or regulator. Exciter 13 and electric motor 8 accelerate at maximum characteristic values Pmax of percussion drill 1. Setpoint repetition rate R is reached, for example, in a duration t1 of preferably less than 1 second, for example, less than 0.5 seconds, or less than 0.2 seconds. Striking mechanism 5 may be completely ready for use in less than 20 cycles, for example, less than 10 cycles, or greater than 5 cycles.

Assuming temperature T is below limiting temperature Tc. The switching-on procedure is now divided into two phases. During the first phase, exciter 13 is accelerated to a repetition rate having a temperature-dependent intermediate value RTc. Intermediate value RTc is greater than 20%, for example, greater than 40%, 60%, and less than 80%, for example, less than 70% of setpoint repetition rate 21. Intermediate value RTc may decrease with expected temperature T. For example, intermediate value RTc2 for −10° C. is less than intermediate value RT1c for −5° C. Intermediate values RTc are greater than the minimum repetition rate from which, at least at room temperature (20° C.), striker 14 may follow the movement of exciter 13. Striker 14 already begins to follow the movement of exciter 13. Because of low repetition rate R, the deflection of striker 14 is still small and accordingly the striking energy is low. Intermediate value RTc is preferably reached as rapidly as possible. A power consumption P of striking mechanism 5, in this example the power consumption of driving electric motor 8, is preferably not limited by a controller or regulator. Exciter 13 and electric motor 8 accelerate at maximum characteristic values Pmax of percussion drill 1 (S6). Intermediate value RTc is reached, for example, in a duration of preferably less than 1 second, for example, less than 0.5 seconds, or less than 0.2 seconds.

After reaching intermediate value RTc (S7), the second phase begins. During the second phase, power consumption P of striking mechanism 5 is reduced to a lower value PTc (S8). The acceleration of exciter 13 is significantly less in the second phase than in the first phase. The acceleration may be less by more than a factor of 10. Exciter 13 may require more than 5 seconds, for example, more than 10 seconds until setpoint repetition rate 21 is reached. For example, exciter 13 only reaches setpoint repetition rate 21 after 200 cycles, for example, after 500 cycles. The user clearly perceives the change of the switching-on procedure. The profile of repetition rate R is shown by solid lines for two different temperatures in FIG. 3.

Upon reaching setpoint repetition rate R (S9), the switching-on procedure is ended and operation (S5) begins.

Figure 4:
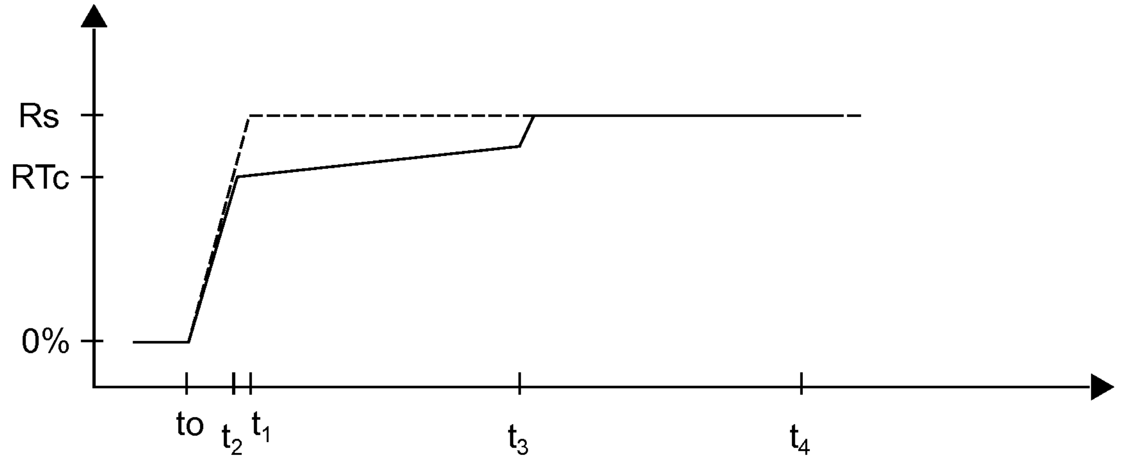
FIG. 4 shows a repetition rate after switching on the percussion drill

A variation of the switching-on procedure is shown in FIG. 4. The sequence is essentially as described for FIG. 2. Percussion drill 1 includes a vibration sensor 23. During the slow acceleration, i.e., using limited power consumption PTc, device controller 20 checks whether the vibration values exceed a vibration limiting value. If the vibration values do not exceed the vibration limiting value, the control method does not differ from FIG. 2. If the vibration limiting value is exceeded, for example, at point in time t3, the acceleration of exciter 13 is increased. Exciter 13 may be accelerated using the maximum acceleration, i.e., unlimited power consumption Pmax, up to setpoint repetition rate 21. The switching-on procedure may be shortened in this way.

Figure 5:
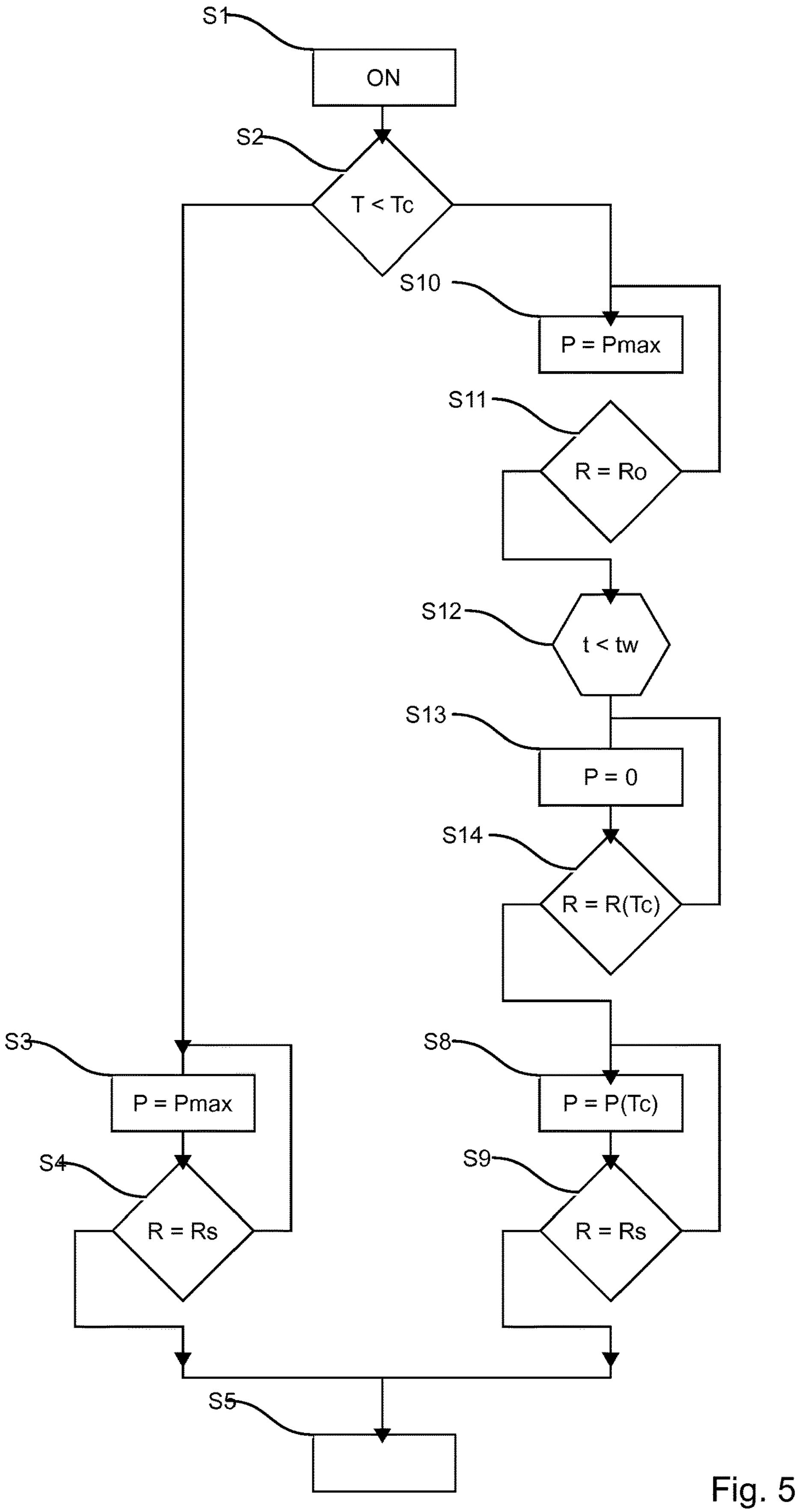
FIG. 5 shows a control diagram
Figure 6:
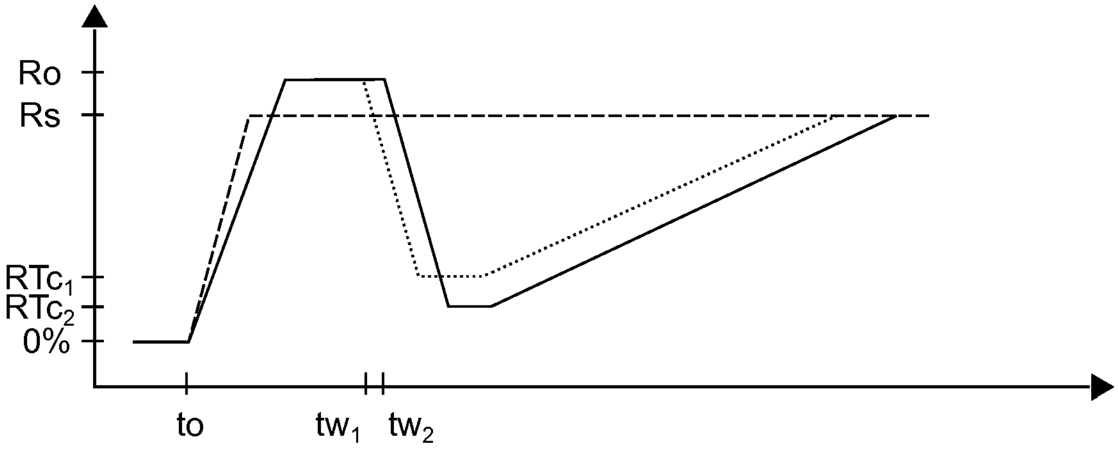
FIG. 6 shows a repetition rate after switching on the percussion drill

FIG. 5 shows an exemplary control plan of device controller 20. FIG. 6 shows the behavior of repetition rate R for different temperatures. The repetition rate is plotted over the ordinate; the time is plotted over the abscissa. The user presses operating button 12. Operating button 12 changes from the off position into the or one of the on positions. Device controller 20 detects the pressed position at point in time t2 (S1). Impact mechanism 5 is now activated.

Device controller 20 detects temperature T from temperature sensor 22 and compares temperature T to a limiting temperature Tc (S2). Limiting temperature Tc is less than, for example, 10° C., for example, at 10° C., 5° C., 0° C., −5° C., −10° C. Limiting temperature Tc may be set, inter alia, as a function of the lubricating oil used in striking mechanism 5.

Assuming temperature T is above limiting temperature Tc. The behavior is identical to the above-described method. Exciter 13 is accelerated as rapidly as possible to setpoint repetition rate R (S3). Upon reaching setpoint repetition rate 21 (S4), percussion drill 1 is completely ready for operation and the switching-on procedure is completed. The further behavior of percussion drill 1 is dependent on the application and the use by the user (S5). The curve of repetition rate R is shown by a dashed line in FIG. 6.

Assuming temperature T is below limiting temperature Tc. The switching-on procedure is divided into two phases.

During the first phase, exciter 13 is maximally accelerated (S10). Power consumption P of striking mechanism 5 is not limited. Exciter 13 is accelerated until reaching a specified value Ro (S11). Specified value Ro is in the range between 80% and 150% of setpoint repetition rate 21. Specified value Ro is temperature-independent. Because of the maximal acceleration, specified value Ro is reached, for example, in a duration of preferably less than 1 second, for example, less than 0.5 seconds, or less than 0.2 seconds. Although exciter 13 is moved, no movement of striker 14 is to be expected. Subsequently, exciter 13 is moved for a predetermined holding time at specified value Ro (S12); for example, until point in time tw after the switching on has passed. The holding time may be between 2 seconds and 20 seconds. The holding time is preferably temperature-dependent. The holding time decreases with rising temperature T. FIG. 6 shows the behavior for a temperature at −5° C. (dotted) and at −10° C. (solid).

Following the holding time, repetition rate R is reduced. Repetition rate R is reduced down to temperature-dependent intermediate value RTc. For example, power consumption P may be set to zero (S13), whereby striking mechanism 5 runs down and quickly becomes slower. Alternatively, power consumption P may be reduced enough that the power consumption no longer compensates for friction losses and thermal losses. Furthermore, striking mechanism 5 may also be actively braked. The reduction of repetition rate R is ended when intermediate value RTc is reached. Intermediate value RTc may be selected in the same way as in the preceding examples.

The second phase, which runs identically as in the preceding examples, follows the first phase. For example, power consumption P is increased to a temperature-dependent value PTc (S8). Exciter 13 is continuously accelerated until setpoint repetition rate 21 is reached (S9). The switching-on procedure is then ended.

Figure 7:
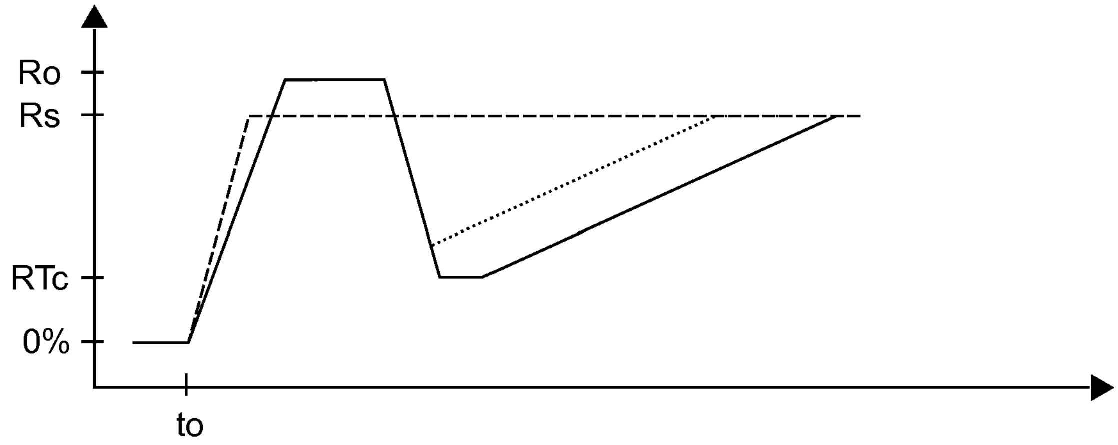
FIG. 7 shows a repetition rate after switching on the percussion drill

Percussion drill 1 may include a vibration sensor 23. Device controller 20 checks, in one variant of the method of FIG. 5, whether vibrations exceed a vibration limiting value during the reduction of repetition rate R (S13/S14). If the vibration limiting value is not exceeded, the method runs as shown in FIG. 5. FIG. 7 illustrates this behavior in the solid line. If the vibration limiting value is exceeded, the reduction of repetition rate R is prematurely ended before temperature-dependent intermediate value RTc is reached. Exciter 13 is immediately accelerated according to the second phase, i.e., steps S8 and S9, to setpoint repetition rate 21.

The invention claimed is:

1. A control method for a percussive hand-held power tool comprising the following steps:

detecting a switching state of an operating button;

detecting a temperature using a temperature sensor;

activating an electropneumatic striking mechanism in response to an actuation of the operating button, an exciter of the electropneumatic striking mechanism being moved forward and backward along a working axis at a repetition rate, a striker coupled to the exciter via a pneumatic chamber also being moved; and if the temperature is greater than a limiting temperature, the repetition rate is continuously increased from idle up to a setpoint value of the repetition rate, a number of cycles of the exciter until reaching the setpoint value being shorter than 10 cycles, and if the temperature is less than the limiting temperature, the number of cycles of the exciter from idle until reaching the setpoint value is greater than 200 cycles.

2. The control method as recited in claim 1 wherein, if the temperature is greater than the limiting temperature, the repetition rate is continuously increased using a first acceleration, and if the temperature is less than the limiting temperature, an intermediate value of the repetition rate is set in a first phase, the repetition rate being increased at least partially at the first acceleration, and in a second phase the repetition rate is continuously increased using a second acceleration up to the setpoint value.

3. The control method as recited in claim 2 wherein the second acceleration is less than 1/10 of the first acceleration.

4. The control method as recited in claim 2 wherein, in the first phase, the repetition rate is continuously increased from idle using the first acceleration up to the intermediate value and subsequently, in the second phase, the repetition rate is continuously increased using the second acceleration up to the setpoint value.

5. The control method as recited in claim 2 wherein, in the first phase, the repetition rate is increased from idle using the first acceleration up to a specified value and the repetition rate is reduced proceeding from the specified value to the intermediate value, and subsequently, in the second phase, the repetition rate is continuously increased using the second acceleration up to the setpoint value.

6. The control method as recited in claim 5 wherein the specified value is between 80% and 150% of the setpoint value.

7. The control method as recited in claim 2 wherein the intermediate value is set as a function of the temperature.

8. The control method as recited in claim 2 wherein, for the first acceleration, the striking mechanism is accelerated using a maximum power consumption.

9. The control method as recited in claim 2 wherein the intermediate value is between 20% and 80% of the setpoint value.

10. The control method as recited in claim 2 wherein the setpoint value is between 30 cycles per second and 150 cycles per second.

11. The control method as recited in claim 1 wherein the exciter is connected to an electric motor via a gearbox.

12. The control method as recited in claim 11 wherein the gearbox includes an eccentric wheel and connecting rod.

13. The control method as recited in claim 11 wherein the gearbox has a stepdown ratio.

14. The control method as recited in claim 1 wherein the temperature sensor is within a machine housing of the hand-held power tool.

15. The control method as recited in claim 14 wherein the temperature sensor is situated on the striking mechanism.

16. The control method as recited in claim 14 wherein the temperature sensor is part of a device controller.

17. The control method as recited in claim 1 wherein a device controller detects the temperature.

18. The control method as recited in claim 1 wherein the hand-held power tool includes a vibration sensor.

19. The control method as recited in claim 18 wherein a device controller compares vibration values from the vibration sensor to a vibration limiting value.

* * * * *